(12) United States Patent
Yun et al.

(10) Patent No.: US 10,901,575 B2
(45) Date of Patent: Jan. 26, 2021

(54) APPARATUS FOR EDITING GRAPHIC OBJECTS

(71) Applicant: LSIS CO., LTD., Gyeonggi-do (KR)

(72) Inventors: Jang-Hyeok Yun, Gyeonggi-do (KR);
Yeo-Chang Yoon, Gyeonggi-do (KR);
Ae-Kyoung Bae, Gyeonggi-do (KR);
Seung-Ju Lee, Gyeonggi-do (KR);
Seok-Chan Lee, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 127 days.

(21) Appl. No.: 15/588,985

(22) Filed: May 8, 2017

(65) Prior Publication Data
US 2018/0074664 A1    Mar. 15, 2018

(30) Foreign Application Priority Data

Sep. 9, 2016   (KR) .......................... 10-2016-0116421

(51) Int. Cl.
*G06F 3/0482* (2013.01)
*G06F 3/0484* (2013.01)
(Continued)

(52) U.S. Cl.
CPC ......... *G06F 3/0482* (2013.01); *G05B 19/042* (2013.01); *G06F 3/0484* (2013.01);
(Continued)

(58) Field of Classification Search
CPC ................................................. G05B 23/0272
See application file for complete search history.

(56) References Cited

U.S. PATENT DOCUMENTS 7,587,061 B1 *   9/2009   Pacenti .............. G06K 9/00476
                                                           382/100
7,609,257 B2 *  10/2009   Wright .................. G06T 11/206
                                                           345/418
(Continued)

FOREIGN PATENT DOCUMENTS

JP       H06-208448 A    7/1994
JP       2002-7432 A     1/2002
(Continued)

OTHER PUBLICATIONS

Draw Your Own Search on Zillow, in Culture (https://www.zillowgroup.com/news/category/culture/) on Feb. 26, 2013 (Year: 2013).*

(Continued)

*Primary Examiner* — William L Bashore
*Assistant Examiner* — Nathan K Shrewsbury
(74) *Attorney, Agent, or Firm* — K&L Gates LLP

(57) ABSTRACT

Disclosed herein is an apparatus for editing graphic objects. More specifically, disclosed herein is an apparatus for editing graphic objects which searches for objects by using a variety of attributes that each of the objects has and displays the found objects and a list of the found objects. The apparatus includes: a display unit configured to display a graphic area and a list area; an input unit configured to receive filter attributes associated with objects from a user; a search unit configured to search one or more objects for an object having object attributes matching the filter attributes; and a control unit configured to control the display unit so that the objects found by the search unit are displayed in the graphic area and a list of the objects found by the search unit is displayed in the list area.

5 Claims, 8 Drawing Sheets

(51) Int. Cl.
  *G06F 8/34*    (2018.01)
  *G06T 11/20*   (2006.01)
  *G06T 11/60*   (2006.01)
  *G05B 19/042*  (2006.01)

(52) U.S. Cl.
  CPC ...... *G06F 3/04845* (2013.01); *G06F 3/04847* (2013.01); *G06F 8/34* (2013.01); *G06T 11/206* (2013.01); *G06T 11/60* (2013.01)

(56) References Cited

U.S. PATENT DOCUMENTS

| | | | | |
|---|---|---|---|---|
| 8,510,349 | B1 * | 8/2013 | Puttick | G06F 16/22 707/805 |
| 8,626,784 | B2 | 1/2014 | Beaudreau et al. | |
| 8,788,431 | B1 * | 7/2014 | Shao | G06Q 50/16 705/313 |
| 9,116,923 | B2 * | 8/2015 | Elliot | G06F 16/248 |
| 9,424,333 | B1 * | 8/2016 | Bisignani | G06F 40/186 |
| 10,318,110 | B2 * | 6/2019 | Naaman | G06F 3/0484 |
| 2003/0028269 | A1 * | 2/2003 | Spriggs | G05B 15/02 700/83 |
| 2003/0174174 | A1 * | 9/2003 | Fitzpatrick | G06F 3/0482 715/809 |
| 2003/0231211 | A1 | 12/2003 | Shah et al. | |
| 2005/0107998 | A1 * | 5/2005 | McLernon | G06F 8/34 703/22 |
| 2006/0074859 | A1 * | 4/2006 | Gange | G06F 17/3053 |
| 2009/0077498 | A1 * | 3/2009 | Shima | G06F 40/14 715/823 |
| 2010/0077334 | A1 * | 3/2010 | Yang | G06F 3/04883 715/769 |
| 2010/0156654 | A1 * | 6/2010 | Bullemer | G05B 23/0272 340/691.6 |
| 2010/0235767 | A1 * | 9/2010 | Hammack | G06T 3/0012 715/763 |
| 2013/0091125 | A1 * | 4/2013 | Elliott | G06F 16/5854 707/722 |
| 2014/0189559 | A1 * | 7/2014 | Bleizeffer | G06F 16/51 715/769 |
| 2014/0297624 | A1 * | 10/2014 | Jarvis | G06F 3/0482 707/722 |
| 2015/0019489 | A1 * | 1/2015 | Kritt | G06F 40/103 707/634 |
| 2015/0127174 | A1 * | 5/2015 | Quam | F24F 11/64 700/276 |
| 2015/0228037 | A1 * | 8/2015 | Wu | G06Q 50/16 705/313 |
| 2016/0292895 | A1 * | 10/2016 | Billi | G06T 11/60 |
| 2017/0277675 | A1 * | 9/2017 | Hirata | G06F 40/103 |
| 2017/0371534 | A1 * | 12/2017 | Baumecker | G06F 3/0482 |
| 2018/0136827 | A1 * | 5/2018 | Bae | G06F 3/04845 |

FOREIGN PATENT DOCUMENTS

| | | |
|---|---|---|
| JP | 4253989 B2 | 4/2009 |
| JP | 2013-31034 A | 2/2013 |
| KR | 10-2015-0056381 A | 5/2015 |
| WO | 2007/045001 A1 | 4/2007 |
| WO | 2015106894 A1 | 7/2015 |
| WO | WO-2016099460 A1 * | 6/2016 ........... G06F 3/0482 |

OTHER PUBLICATIONS

European Search Report for related European Application No. 17168437.6; report dated Oct. 25, 2017; (7 pages).

* cited by examiner

| | |
|---|---|
| LAYER ATTRIBUTE | ☐ LAYER 1<br>☑ LAYER 2<br>☐ LAYER 3 |
| NAME ATTRIBUTE | |
| DYNAMIC ATTRIBUTE | ☐ APPEARANCE ☐ MOVEMENT ☐ ROTATION<br>☐ ENLARGEMENT ☐ REDUCTION ☐ BLINK |
| SHAPE ATTRIBUTE | ☑ Rectangle ☐ Ellipse ☐ Triangle |
| TYPE ATTRIBUTE | ☐ BUTTON ☐ EVENT ☐ OCX |
| GRAPHIC ATTRIBUTE | ☐ IMAGE ☐ TEXT |
| FONT ATTRIBUTE | ☐ ARIAL ☐ HELIUM ☐ GOTHIC |
| SIZE ATTRIBUTE | ☐ 5 < SIZE < 10 ☐ 10 < SIZE < 20 |
| STYLE ATTRIBUTE | ☐ BOLD ☐ ITALIC |

FIG. 4

| LAYER ATTRIBUTE | LAYER 2 ▽ |
|---|---|
| NAME ATTRIBUTE | |
| DYNAMIC ATTRIBUTE | APPEARANCE ▽ |
| SHAPE ATTRIBUTE | Ellipse ▽ |
| TYPE ATTRIBUTE | EVENT ▽ |
| GRAPHIC ATTRIBUTE | -- ▽ |
| FONT ATTRIBUTE | GOTHIC ▽ |
| SIZE ATTRIBUTE | 8 ▽ |
| STYLE ATTRIBUTE | ITALIC ▽ |

FIG. 7

| | |
|---|---|
| LAYER ATTRIBUTE | ☐ LAYER 1<br>☑ LAYER 2<br>☐ LAYER 3 |
| NAME ATTRIBUTE | |
| DYNAMIC ATTRIBUTE | ☐ APPEARANCE  ☐ MOVEMENT  ☑ ROTATION<br>☐ ENLARGEMENT  ☐ REDUCTION  ☐ BLINK |
| SHAPE ATTRIBUTE | ☑ Rectangle  ☐ Ellipse  ☐ Triangle |
| TYPE ATTRIBUTE | ☐ BUTTON  ☐ EVENT  ☐ OCX |
| GRAPHIC ATTRIBUTE | ☐ IMAGE  ☐ TEXT |
| FONT ATTRIBUTE | ☐ ARIAL  ☐ HELIUM  ☐ GOTHIC |
| SIZE ATTRIBUTE | ☐ 5 < SIZE < 10  ☐ 10 < SIZE < 20 |
| STYLE ATTRIBUTE | ☑ BOLD  ☐ ITALIC | though.

APPARATUS FOR EDITING GRAPHIC OBJECTS

CROSS-REFERENCE TO RELATED APPLICATIONS

This application claims the benefit of Korean Patent Application No. 10-2016-0116421, filed on Sep. 9, 2016, entitled "APPARATUS FOR EDITING GRAPHIC OBJECTS", which is hereby incorporated by reference in its entirety into this application.

BACKGROUND

1. Technical Field

The present disclosure relates to an apparatus for editing graphic objects. More specifically, the present disclosure relates to an apparatus for editing graphic objects which searches for objects by using a variety of attributes that each of the objects has and displays the found objects and a list of the found objects.

2. Description of the Related Art

A supervisory control and data acquisition (SCADA) system is a large-scale system that processes and monitors a large volume of data and provides a variety of functions associated therewith. In particular, such a SCADA system is frequently employed for controlling a large-scale process, and a human machine interface (HMI) is used to intuitively identify and manage data associated with the process.

Such HMI is typically connected to the software and database of the SCADA system and provides analysis functions using various data generated from the process. To this end, the HMI displays the data associated with the process on the screen in the form of human-recognizable objects, and the user can analyze and manage the process using the objects.

More specifically, each of the objects used in the corresponds to the respective data related to the process, and the objects have inherent attributes according to their roles and functions. The user can determine a process with which an object is associated, based on the attributes of the object.

As the industry grows and the complexity of the process increases, the attributes of the objects used in the HMI are refined more and more. Accordingly, there is a demand for an apparatus for editing graphic objects that selectively searches only an object desired by a user and displays only the found object on the screen in order to manage the entire process system through the objects.

However, the existing apparatuses have a problem that they provide searching using the names of the objects only, such that it is not possible to search in a variety of methods. In addition, the existing apparatuses have a problem in that, when there are objects in multiple graphic layers, they cannot be hierarchically displayed.

In addition, the existing apparatuses cannot provide searching through various attributes of objects, resulting in low accuracy of searching. Moreover, the existing apparatuses perform searching for the entire objects, but cannot perform searching within a range designated by the user, which lowers the selectivity of the searching.

SUMMARY

It is an object of the present disclosure to provide an apparatus for editing graphic objects that searches for objects by using one or more filtering attributes to allow for searching by various methods.

It is another object of the present disclosure to provide an apparatus for editing graphic objects capable of intuitively identifying attributes of a found object by displaying a found object and a list of found objects.

It is another object of the present disclosure to provide an apparatus for editing graphic objects capable of increasing accuracy of searching by searching objects using various filtering attributes such as a layer attribute, a name attribute, a dynamic attribute, a shape attribute, a type attribute, a graphic attribute, a font attribute, a size attribute and a style attribute.

It is another object of the present disclosure to provide an apparatus for editing graphic objects capable of increasing the selectivity of searching by determining target objects and searching for an object matching the filtering attribute among the target objects.

It is another object of the present disclosure to provide an apparatus for editing graphic objects capable of identifying the similarity between a target object and a found object by arranging the found objects according to the number of object attributes matching the filtering attributes or the attributes of the object selected by the user.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for editing graphic objects includes: a display unit configured to display a graphic area and a list area; an input unit configured to receive filter attributes associated with objects from a user; a search unit configured to search one or more objects for an object having object attributes matching the filter attributes; and a control unit configured to control the display unit so that the objects found by the search unit are displayed in the graphic area and a list of the objects found by the search unit is displayed in the list area.

According to an exemplary embodiment of the present disclosure, an object is searched for using one or more filtering attributes to thereby provide searching by various methods.

According to an exemplary embodiment of the present disclosure, found objects and a list of the found objects are displayed, so that the attributes of the found objects can be intuitively identified.

According to an exemplary embodiment of the present disclosure, objects can be searched for by using various filtering attributes such as a layer attribute, a name attribute, a dynamic attribute, a shape attribute, a type attribute, a graphic attribute, a font attribute, a size attribute and a style attribute, such that the accuracy of the searching can be improved.

According to an exemplary embodiment of the present disclosure, target objects are set and objects matching the filtering attributes among the target objects are searched for, such that the selectivity of the searching can be improved.

According to an exemplary embodiment of the present disclosure, the found objects are arranged according to the number of object attributes matching the filtering attributes or the attributes of the object selected by the user, such that the similarity between target objects and found objects can be determined.

BRIEF DESCRIPTION OF DRAWINGS

FIG. 3 is a diagram showing an example of checkboxes for receiving filtering attributes;

FIG. 4 is a diagram showing an example of pull-down menus for receiving filtering attributes;

FIG. 7 is a diagram showing checkboxes where filtering attributes are selected.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings.

Figure 1:
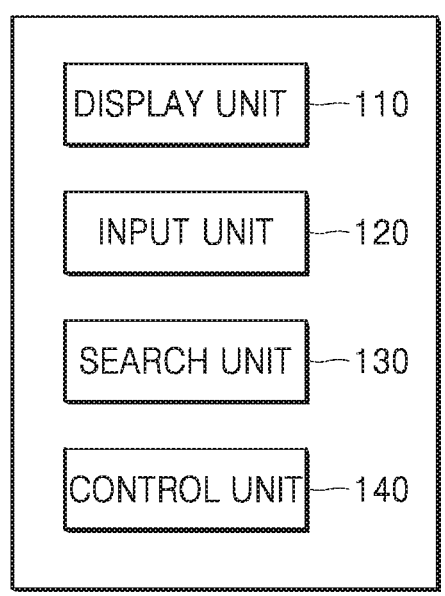
FIG. 1 is a diagram showing an apparatus for editing graphic objects according to an exemplary embodiment of the present disclosure.

FIG. 1 is a diagram showing an apparatus for editing graphic objects according to an exemplary embodiment of the present disclosure. Referring to FIG. 1, the apparatus for editing graphic objects may include a display unit 110, an input unit 120, a search unit 130 and a control unit 140. The apparatus shown in FIG. 1 is merely an exemplary embodiment of the present disclosure, and the elements are not limited to those shown in FIG. 1. Some elements may be added, modified or eliminated as desired.

Figure 2:
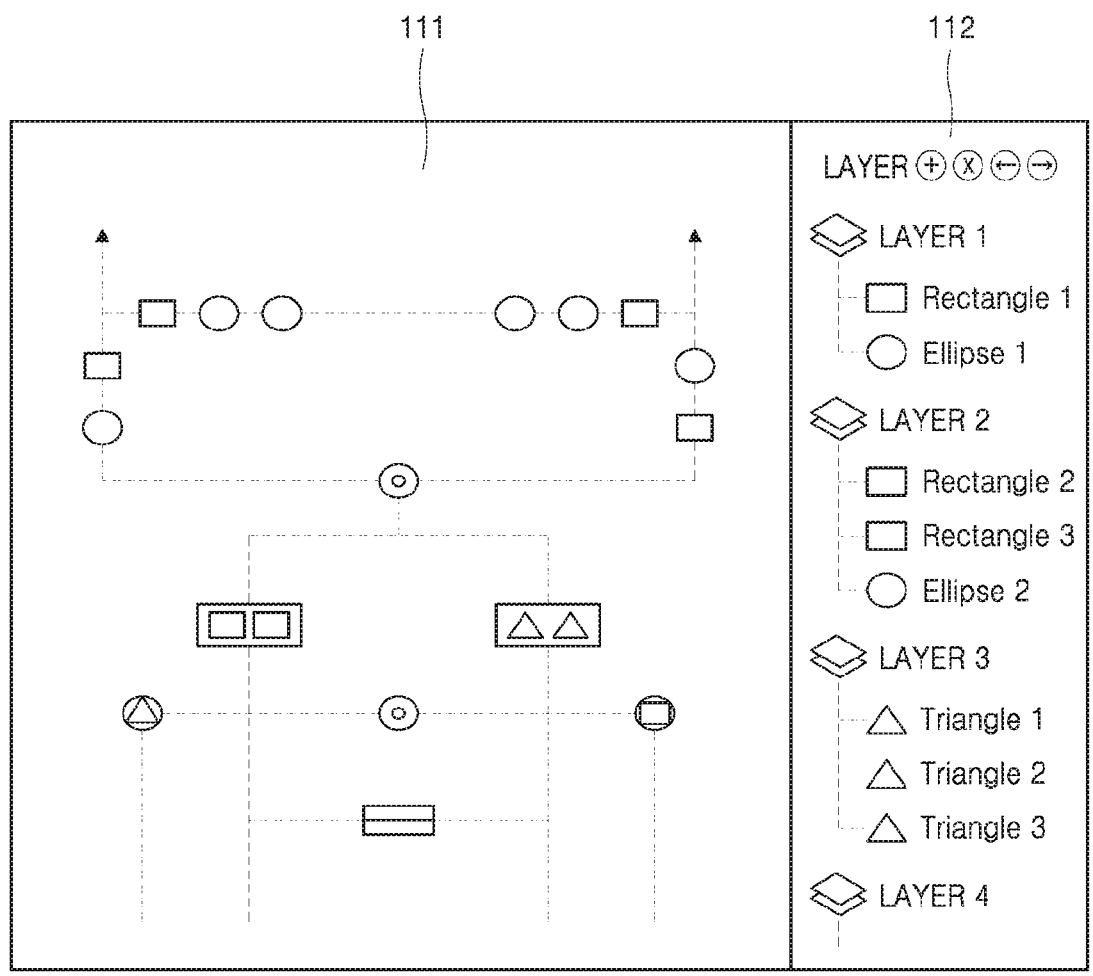
FIG. 2 is a diagram showing an example of a graphic area and a list area displayed on a display unit.

FIG. 2 is a diagram showing an example of a graphic area and a list area displayed on the display unit. Hereinafter, the display unit 110 according to the exemplary embodiment of the present disclosure will be described in detail with reference to FIGS. 1 and 2.

Referring to FIG. 2, the display unit 110 according to the exemplary embodiment of the present disclosure may display a graphic area 111 including one or more objects, and a list area 112 including a list of one or more objects. In other words, the display unit 110 may be divided into the graphic area 111 and the list area 112. The graphic area 111 may display the objects while the list area 112 may display the list of the objects.

As used herein, an object may be data that has one or more attributes and is displayed in a particular shape. For example, an HMI used in a supervisory control and data acquisition (SCADA) system that controls a large-scale process is typically connected to the software and database of the SCADA system.

Such an HMI may provide analysis capability using various data generated in the process. To this end, the HMI may display, on the screen, data associated with the process, for example, the planes facility or the specific value indicated by the facility in the form of objects that can be recognized by human. The user can analyze and control the process associated with the objects by using the attributes of the objects.

Referring again to FIG. 2, the display unit 110 may be divided into the graphic area 111 and the list area 112. In the graphic area 111, one or more objects each having a certain shape may be displayed. In the list area 112, a list of the objects may be displayed.

The objects may be disposed on different layers. Layers are used to display several images by superimposing them. By using the layers, the objects can be sorted by use or functionality and accordingly users may edit the objects layer-by-layer.

More specifically, the graphic area 111 may display one or more objects each having different shapes depending on use or functionality. In addition, the graphic area 111 may display the objects included in all of the layers simultaneously or may display the objects included in each of the layers only.

In the graphic area 111, the positional and connective relationships among the objects may indicate the order and steps of the process associated with the objects and may indicate connective relationships among multiple power devices performing the process.

The list area 112 may display a list of one or more objects with different layers. In other words, the list area 112 may display a list of layers and a list of objects in each of the layers. Accordingly, the user can monitor the general flow or procedure of the process through the graphic area 111, and monitor the use or functionality of each process according to the layers through the list area 112.

As such, the objects each associated with the data of the respective processes may have a unique attribute that is distinguished from other objects having different uses and functionality. The user can efficiently control the process by sorting the attributes of objects based on certain criterion.

The input unit 120 according to the exemplary embodiment of the present disclosure may receive filtering attributes for objects to be displayed on the display unit 110 from a user. As used herein, an object attribute refers to an attribute that an object has, and a filtering attribute refers to an attribute among the attributes that a user looks for.

More specifically, the object attributes and filtering attributes may include at least one of a layer attribute, a name attribute, a dynamic attribute, a shape attribute, a type attribute, a graphic attribute, a font attribute, a size attribute and a style attribute.

The layer attribute may include information on a layer to which an object belongs when editing a graphic object. The name attribute may include a unique name of each object.

The dynamic attribute may include information on the motion of an object displayed in the graphic area 111. For example, the dynamic attribute may include information on whether an object is selectively displayed (Appearance) according to a specific condition, information on whether the object is moving (Movement). The dynamic attribute may also include information on whether an object is rotating (Rotation), increasing (Enlargement), decreasing (Reduction), or blinking at certain intervals (Blink).

The shape attribute may include information on the shape of an object. For example, the shape attribute may include information on whether the shape of an object is a rectangle, an ellipse, a triangle, or the like. These shape attributes may include any shape supported by the software that creates the object.

The type attribute may contain information on the functionality of an object. For example, the type attribute may include information on whether an object triggers a predetermined event when it is selected (Event). In addition, the type attribute may also include information on whether an object has an OLE Control Extension (OCX).

The graphic attribute may include information on whether a graphic of an object is an image fetched from inside or outside a program that creates the object. In addition, the graphic attribute may include information on whether an object is a text object which itself is made up of text.

The font attribute, the size attribute and the style attribute may include information on characters included in the name of an object or information on the above-described texts of the text object.

FIG. 3 is a diagram showing an example of a checkbox for receiving filtering attributes. Referring to FIG. 3, the input unit 120 may receive filtering attributes via checkboxes on the layer attribute, the name attribute, the dynamic attribute, the shape attribute, the type attribute, the graphic attribute, the font attribute, the size attribute and the style attribute. The checkbox may be displayed on the display unit 110, and the user may enter the filtering attributes through any input device such as a mouse and a keyboard.

The checkboxes may include a checkbox for the layer attribute (Layer 1, Layer 2 or Layer 3) of an object, and may include a window for entering a name attribute where the name of the object may be entered. In addition, the checkbox may include a checkbox for the dynamic attributes such as the above-mentioned appearance, movement, rotation, enlargement, reduction and blink, and a checkbox for the shape attributes (Rectangle, Ellipse or Triangle) of the object.

The checkbox may include a checkbox for a type attribute of an object (Button, Event or OCX), and a checkbox for a graphic attribute (Image or Text) of the object. In addition, the checkboxes may include a checkbox for the name of an object, the font attribute of a text object (Arial, Helium or Gothic), the size attribute (5<size<10 or 10<size<20) and the style attributes (Bold or Italic).

FIG. 4 is a diagram showing an example of a pull-down menu for receiving filtering attributes. Referring to FIG. 4, the input unit 120 may receive filtering attributes via pull-down menus on the layer attribute, the name attribute, the dynamic attribute, the shape attribute, the type attribute, the graphic attribute, the font attribute, the size attribute and the style attribute.

The pull-down menus each corresponding to the respective attributes may include all of the attributes described above with reference to FIG. 3. In addition, the pull-down menus may include a menu for not selecting any attribute, like the graphic attribute shown in FIG. 4. The filtering attributes described in FIGS. 3 and 4 may be changed depending on the software for editing graphic objects and the user's setting, and some attributes may be added, changed or deleted.

A user may combine multiple attributes to enter it as the filtering attributes. For example, in FIG. 3, the user may enter filtering attributes to display a rectangular object belonging to Layer 2 on the display unit 110. To do so, the user may use the input unit to mark the checkbox for Layer 2 and the checkbox for Rectangle. In this manner, the user can specify the object to be displayed on the display unit 110 by combining multiple attributes.

The search unit 130 according to an exemplary embodiment of the present disclosure may search one or more objects for an object having object attributes matching the filtering attributes. The search unit 130 may further include a separate storage unit such as a database (DB) storing all object attributes of one or more objects. The search unit 130 may compare the filtering attribute input from the user through the input unit 120 with the object attributes stored in the storage unit to find an object having object attributes matching the filtering attributes.

As mentioned earlier, an object attribute refers to an attribute that an object has, and a filtering attribute refers to an attribute among the attributes that a user looks for. Accordingly, the object attributes matching the filter attributes may include all of the filtering attributes.

For example, referring to FIG. 3, the search unit 130 may search for an object having object attributes matching the entered filtering attributes, i.e., Layer 2 and Rectangle. At this time, the search unit 130 may search for all the objects included in Layer 2 and having a rectangular shape.

In other words, the search unit 130 may search for all objects that are included in Layer 2 and are rectangular irrespectively of other attributes (name attribute, dynamic attribute, type attribute, graphic attribute, font attribute, size attribute, and style attribute). Accordingly, the object attributes of the found objects may include both of the filtering attributes (Layer 2 and Rectangle).

As described above, the filtering attributes may be a combination of multiple attributes, and the search unit 130 may search for objects having object attributes including all of the combined filtering attributes. Therefore, the accuracy can be increased with the combination of multiple attributes.

The input unit 120 according to the exemplary embodiment of the present disclosure may receive a target object selected by a user from among one or more objects. More specifically, the input unit 120 may further receive a target object as well as filtering attributes through the checkboxes or the pull-down menus from a user. Then, the search unit 130 may search the target objects for an object having object attributes matching the filtering attributes.

Figure 5:
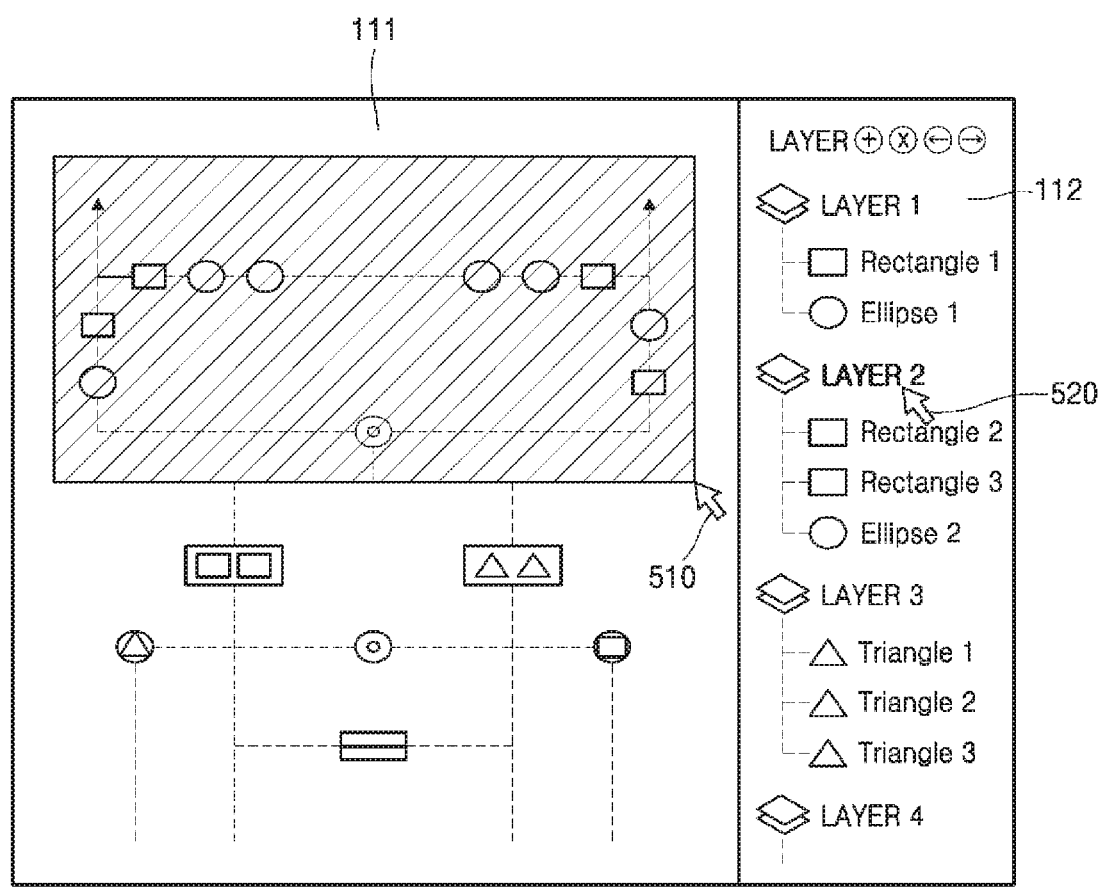
FIG. 5 is a diagram showing a process of selecting some of the objects from among the objects displayed in the graphics area and the list area.

FIG. 5 is a diagram showing a process of selecting some of the objects from among the objects displayed in the graphics area and the list area. Referring to FIG. 5, the display unit 110 may receive a target object from the user via the graphic area 111 or the list area 112 displayed on the display unit 112.

In other words, the input unit 120 may receive a user's instruction via the display unit 110 without any additional input means such as the above-described checkboxes or the pull-down menus. The user may select some of the objects displayed in the graphic area 111 or some list of the lists of the objects displayed in the list area 112 to enter a target object.

When a mouse is used to enter a target object, the user may drag a some portion in the graphics area 111 (510) to set a target object including one or more objects. In addition, the user may click Layer 2 in the list area 112 (520) to set the target object to be an object belonging to Layer 2.

The target object may be entered either before or after the filtering attributes are inputted depending on the user setting. When the target objects and the filtering attributes are entered, the search unit 130 may search the target objects for an object having object attributes matching the filtering attributes. By setting the range of target objects in this manner, the degree of selectivity of searching can be increased.

Referring again to FIGS. 3 and 5, before entering the filter attributes of FIG. 3, the user may drag some portion of the graphic area 111 of FIG. 5 with the mouse (510) to set the target objects. Then, the user may enter the filtering attributes of Layer 2 and Rectangle through the checkboxes of FIG. 3. When the target objects and the filtering attributes are entered, the search unit 130 may search the target objects for an object having object attributes matching the filtering attributes.

The control unit 140 according to an exemplary embodiment of the present disclosure may control the display unit 110 so that the objects found by the search unit 130 are displayed in the graphics area 111. In addition, the control unit 140 may control the display unit 110 so that the list of objects found by the search unit 130 are displayed in the list area 112. Accordingly, the display unit 110 may list the found objects in the list area 112 and display the listed objects in the graphic area 111 under the control of the control unit 140.

Figure 6:
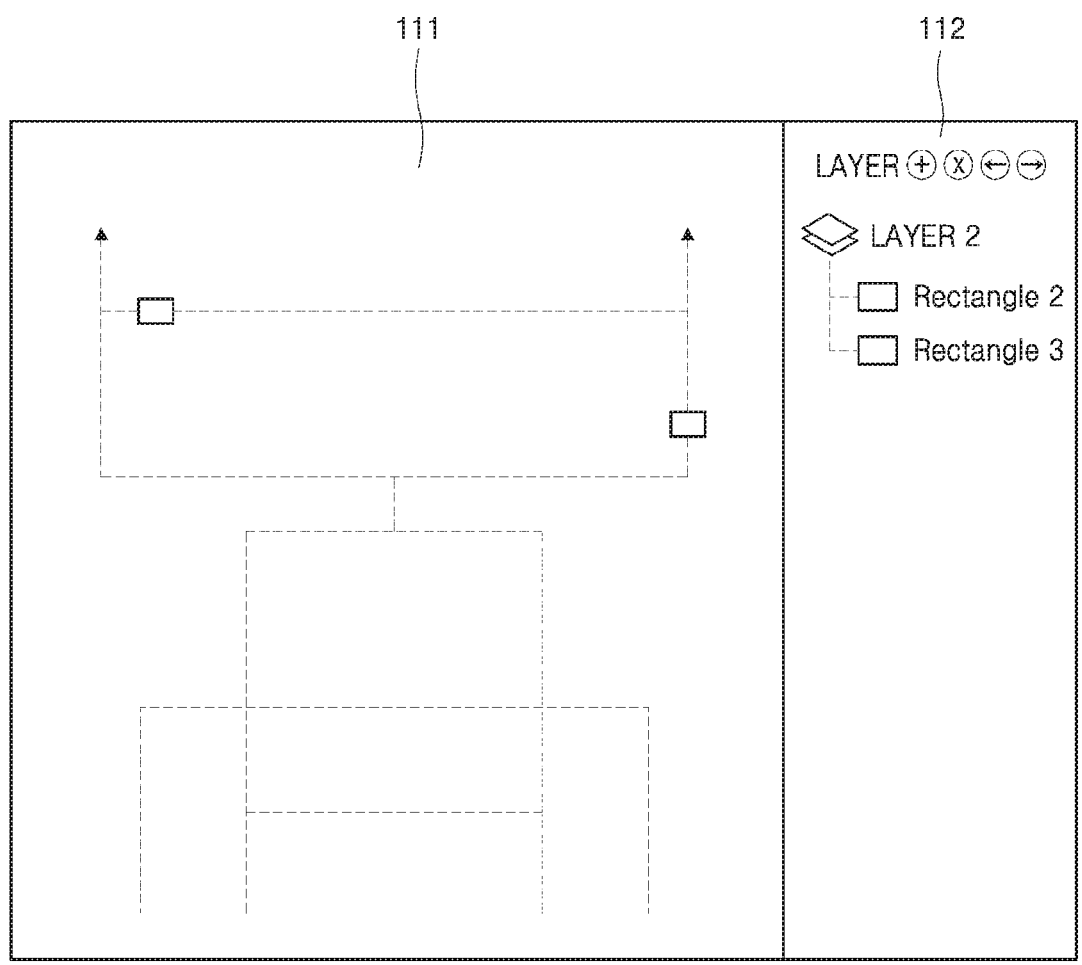
FIG. 6 is a diagram showing the found objects displayed in the graphics area and a list of the found objects displayed in the list area.

FIG. 6 is a diagram showing the found objects displayed in the graphics area and a list of found objects displayed in the list area. Referring to FIG. 6, objects having the filtering attributes of FIG. 3, i.e., Layer 2 and Rectangular may be found from among the target objects in the hatched area of FIG. 5.

The control unit 140 may control the display unit 110 so that only the found objects are displayed. Accordingly, the display unit 110 may display the list of Rectangle 2 and Rectangle 3 included in Layer 2 in the list area 112, and may display Rectangle 2 and Rectangle 3 in the graphics area 111.

In addition, the control unit 140 may control the display unit 110 so that it arranges the found objects according to the number of object attributes matching the filtering attributes, and displays the list of the found objects in the list area 112 according to the arranged order. The object attributes of the found objects may include all or some of the filtering attributes.

Figure 8:
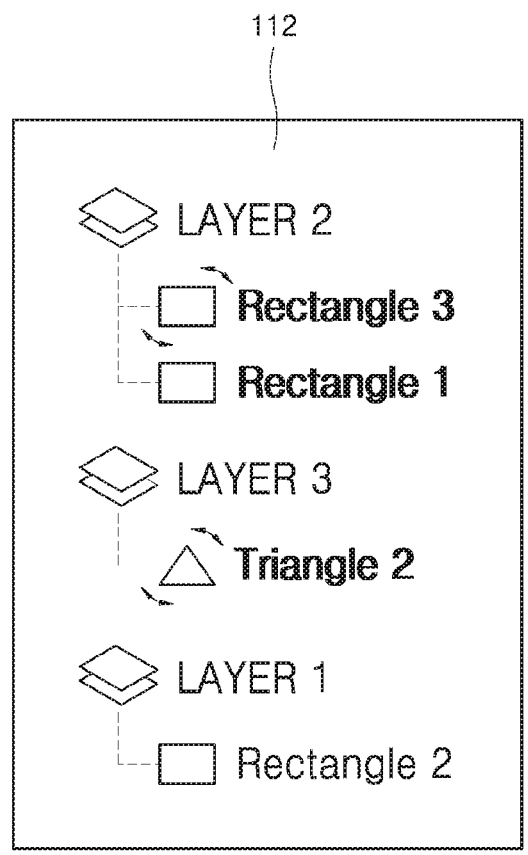
FIG. 8 shows a list of objects arranged according to the number of object attributes matching the filtering attributes input in FIG. 7.

FIG. 7 is a diagram showing checkboxes where filtering attributes are selected. FIG. 8 shows a list of objects arranged according to the number of object attributes matching the filtering attributes input in FIG. 7.

Referring to FIGS. 7 and 8, the user may enter filtering attributes, which are a combination of Layer 2, Rotation, Rectangle and Bold, through the checkboxes of FIG. 7. Accordingly, the found Rectangle 3 included in Layer 2 of FIG. 8 may include all the filtering attributes. In other words, Rectangle 3 is included in Layer 2, the object rotates, it has a rectangle shape and the font is bold, so it can include all of the four filtering attributes.

Rectangular 1 included in Layer 2 may include three of the filter attributes, i.e., Layer 2, Rectangular and Bold. Triangle 2 included in Layer 3 may include two of the filter attributes, i.e., Rotation and Bold. In addition, Rectangular 2 included in Layer may include only one of the filter attributes, i.e., Rectangle.

The control unit 140 may control the display unit 110 so that the found objects are displayed in the descending order of the number of object attributes matching the filtering attributes. Accordingly, the display unit 110 may display the found objects in the list area 112 in the order of Rectangle 3, Rectangle 1, Triangle 2 and Rectangle 2.

Alternatively, the control unit 140 may control the display unit 110 so that the found objects are displayed in the ascending order of the number of object attributes matching the filtering attributes. The above-described order may be changed according to the users setting.

According to an exemplary embodiment of the present disclosure, the input unit 120 may receive an object selected by a user from among one or more objects. More specifically, the input unit 120 may receive the selected object only, instead of receiving filtering attributes through the checkboxes or the pull-down menus. Then, the search unit 130 may search the one or more objects for an object having object attributes matching the object attributes that the selected object has.

More specifically, the user may select one of the objects displayed in the graphic area 111 or the list area 112 of the display unit 110 as a selected object without entering the filtering attributes described above with reference to FIGS. 3 and 4. Once the selected object is selected, the search unit 130 may search for objects having object attributes matching the object attributes of the selected object.

In addition, when the input unit 120 receives the selected object selected by the user, the control unit 140 may control the display unit 110 so that the object attributes of the selected object is represented through the checkboxes or the pull-down menus shown in FIG. 3 or 4. For example, if the selected object selected by the user belongs to Layer 2 and has a rectangular shape, the checkboxes of FIG. 3 may be displayed on the display unit 110.

The user may search for another object with the displayed object attributes via the checkboxes or the pull-down menus. In addition, the user may edit some of the object attributes displayed in the checkboxes or pull-down menus and may search for another objects with the edited object attributes. Such searching may be performed upon receiving a searching instruction from a user.

In other words, the user can select the selected object without entering the filtering attributes to input the object attributes of the selected object as the filtering attributes. At this time, the search unit 130 may search for objects having the object attributes matching the filtering attributes.

In addition, the user can configure the filtering attributes by adding, modifying or deleting some attributes of the object attributes of the selected object through checkboxes or pull-down menus. At this time, the search unit 130 may search for objects having the object attributes matching the edited filtering attributes.

The found object attributes may include all or some of the object attributes of the selected objects. For example, the object attributes of the selected object may be the same as the attributes checked in FIG. 7. That is, the selected object may be included in Layer 2, may have a rectangular shape, may be rotatable, and may have the name in bold font. Accordingly, objects found by the searching unit 130 may be the same as Rectangles 1 to 3 and Triangle 2 of FIG. 8.

Then, the control unit 140 may control the display unit 110 so that it arranges the found objects according to the number of object attributes matching the object attributes that the selected object has, and displays the list of the found objects in the list area 112 according to the arranged order. The operations of the control unit 140 are the same as those described above with respect to FIGS. 7 and 8; and, therefore, redundant description will be omitted.

According to an exemplary embodiment of the present disclosure, an object is searched for using one or more filtering attributes to thereby provide searching by various methods. According to an exemplary embodiment of the present disclosure, found objects and a list of the found objects are displayed, so that the attributes of the found objects can be intuitively identified.

According to an exemplary embodiment of the present disclosure, objects can be searched for by using various filtering attributes such as a layer attribute, a name attribute, a dynamic attribute, a shape attribute, a type attribute, a graphic attribute, a font attribute, a size attribute and a style attribute, such that the accuracy of the searching can be improved.

According to an exemplary embodiment of the present disclosure, target objects are set and objects matching the filtering attributes among the target objects are searched for, such that the selectivity of the searching can be improved. According to an exemplary embodiment of the present disclosure, the found objects are arranged according to the number of object attributes matching the filtering attributes or the attributes of the object selected by the user, such that the similarity between target objects and found objects can be determined.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An apparatus for editing graphic objects comprising:
a display unit configured to display a graphic area including a plurality of objects and a list area including a list of the plurality of objects, wherein the display unit is configured to display the graphic area and the list area at the same time;
an input unit configured to receive a selected object selected by a user among the plurality of objects without having the user enter filtering attributes separately;
a search unit configured to search target objects for an object having object attributes matching object attributes of the selected object; and
a control unit configured to control the display unit so that only the objects found by the search unit are displayed in the graphic area and a list of only the objects found by the search unit is displayed in the list area, wherein the objects found by the search unit and the list of the objects found by the search unit are displayed in the display unit at the same time;
wherein the control unit is configured to control the display unit so that the object attributes of the selected object are displayed when the input unit receives the selected object selected by the user.

2. The apparatus of claim 1, wherein the graphic area displays the plurality of objects having a predetermined shape.

3. The apparatus of claim 1, wherein the display unit displays a list of layers and a list of objects included in each of the layers in the list area.

4. The apparatus of claim 1, wherein the object attributes include at least one of a layer attribute, a name attribute, a dynamic attribute, a shape attribute, a type attribute, a graphic attribute, a font attribute, a size attribute and a style attribute.

5. The apparatus of claim 1, wherein the control unit controls the display unit so that it arranges the found objects according to the number of object attributes matching the object attributes of the selected object, and displays the list of found objects in the list area according to the arranged order.

* * * * *